(12) United States Patent
Love et al.

(10) Patent No.: US 6,263,908 B1
(45) Date of Patent: Jul. 24, 2001

(54) SLOW OPENING GAS VALVE

(75) Inventors: John J. Love, St. Louis; Mike C. Santinanavat, Chesterfield, both of MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/412,835

(22) Filed: Oct. 5, 1999

(51) Int. Cl.$^7$ .................................................. F16K 31/126
(52) U.S. Cl. ........................... 137/489; 137/66; 137/491; 137/613; 251/47
(58) Field of Search .............. 137/66, 489, 491, 137/613; 251/47

(56) References Cited

U.S. PATENT DOCUMENTS

| | | |
|---|---|---|
| 2,174,515 | 10/1939 | Hughes . |
| 3,433,409 | 3/1969 | Jackson et al. . |
| 3,578,243 | * 5/1971 | Love ............................. 137/614.19 |
| 3,648,727 | 3/1972 | Huyck . |
| 3,727,836 | 4/1973 | Visos et al. . |
| 3,747,629 | 7/1973 | Bauman . |
| 4,044,794 | 8/1977 | Matthews . |
| 4,247,077 | 1/1981 | Banick et al. . |
| 5,555,910 | 9/1996 | Powell et al. . |

* cited by examiner

*Primary Examiner*—Gregory L. Huson
*Assistant Examiner*—Ramesh Krishnamurthy
(74) *Attorney, Agent, or Firm*—Harness Dickey & Pierce

(57) ABSTRACT

An improved slow opening gas valve providing for continuous gradual and smooth opening of the gas valve includes an expansible auxiliary chamber connected to an expansible control chamber by a metering orifice. The expansible auxiliary chamber slows expansion of the expansible control chamber, thereby slowing opening of the gas valve and allowing gas to ignite at a lower pressure with a much less audible sound. The gas valve is provided with a normally closed valve member for controlling flow of gas through the gas valve and a diaphragm forms a movable wall of the expansible control chamber that is operable upon expansion of the chamber to move the valve member to an open position. The expansible auxiliary chamber also comprises a movable diaphragm to control the opening of the gas valve and provide gas flow gradually and smoothly. In an alternate embodiment, a gas valve is configured to provide an initial gas flow through a bypass orifice in the closed valve member, which enables ignition of the gas at an optimum gas pressure instantly, followed by a gradual and smooth opening of the valve member. This arrangement provides a "step" function followed by the desired slow opening of the valve member.

18 Claims, 7 Drawing Sheets

SLOW OPENING GAS VALVE

BACKGROUND OF THE INVENTION

1) Field of the Invention

The present invention is directed to the field of gas controls, and in particular to an improved slow opening gas valve having an expansible auxiliary chamber connected to an expansible control chamber by a metering orifice to slow the expansion of the expansible control chamber and thereby slow the opening of the gas valve.

2) Description of the Related Art

It is well known that gas valves of the type to which the present invention relates are configured to provide gas at an outlet for ignition at a specific pressure level. In many of these gas valves, the amount of gas provided at the outlet at the time ignition takes place causes an undesirable audible ignition. This audible ignition results from the rapid opening of the gas valve which causes excessive gas build-up in the combustion chamber of for example, a furnace, before ignition. Thus, many of these "fast" open gas valves introduce too much gas before ignition takes place, thereby causing a very rough and/or audible ignition. In addition to producing this undesirable audible ignition, these gas valves may create large flames upon ignition which could be dangerous.

A variety of gas valves are known in the art for providing slow opening valves and ignition at lower gas pressures. In general, however, many of the known-gas valves do not provide a sufficient duration of continuous valve opening and further do not provide a smooth and gradual opening of the gas valve. Additionally, these gas valves are generally complex in both design and operation, thereby increasing the likelihood of problems during operation.

Some of these known valves attempt to restrict the flow of gas to the operating or control gas side of a regulator diaphragm, while others add tortuous paths to the operating side of a regulator diaphragm. Still other valves add second diaphragms to regulate operating pressure or utilize solenoids in connection with pumps to slow the opening of the valves. Finally, other known gas valves include pressure relief valves or regulated by-pass valves for controlling gas pressure.

Generally, the known gas valves which include a second diaphragm, do not use that second diaphragm to slow the opening of the valve, but utilize the diaphragm to control operating pressure or venting of the valves. Overall, these gas valves are relatively complex, which may result in problems with reliability. Further, these gas valves fail to provide both a slow and continuous smooth opening of the valve. Thus, an undesirable audible or rough ignition may still occur.

What was needed was a gas valve with a simple design, that could be produced inexpensively, and that not only provided gas flow for lower pressure ignition, but also provided gas at a continuously and smoothly increasing rate to avoid undesirable rough or audible ignitions.

SUMMARY OF THE INVENTION

In order to overcome these shortcomings and other needs in the art, the slow opening gas valve of the present invention introduces considerably less gas at the time of ignition by providing continuous gas flow both slowly and smoothly increasing, therefore allowing gas to ignite at a lower pressure with a much less audible sound.

According to one aspect of the present invention, a slow opening gas valve is constructed to allow gas to ignite at a low pressure, thus providing a much lower audible and less rough ignition, along with less rollout of gas flame upon ignition. The slow open gas valve of the present invention is of the type having an inlet, an outlet and an expansible control chamber. The gas valve is provided with a normally closed valve member for controlling flow of gas through the gas valve. A diaphragm forms a movable wall of the expansible control chamber and is operable upon expansion of the chamber to move the valve member to an open position. The improvement to the gas valve is an expansible auxiliary chamber connected to the expansible control chamber by a metering orifice, which slows the expansion of the expansible control chamber and thereby slows the opening of the valve member in the gas valve. The expansible auxiliary chamber comprises a moveable diaphragm and a control device, such as a regulator preferably comprising a biasing spring, for controlling movement of the diaphragm.

The volumes of the expansible control chamber and expansible auxiliary chamber are preferably configured to coordinate to slow the opening of the valve member and provide continuous gas flow at the outlet smoothly. The volumes of the expansible chambers are configured to provide control of the opening of the valve member, such that gas at the outlet is provided gradually. Additionally, the diameter of the metering orifice is configured to control gas flow from the expansible control chamber to the expansible auxiliary chamber, thereby slowing the opening of the valve member and providing gas at the outlet gradually and smoothly.

According to another aspect of the present invention, a slow opening gas valve with a normally closed valve member is provided with a bypass orifice which is configured to initially allow a required flow with the valve member closed, followed by a gradual and smooth opening provided by the expansible chambers and the metering orifice. This initial flow through the bypass orifice provides a "step" function followed by the desired slow opening of the valve member. This function provides optimum outlet pressure for gas ignition instantly and thereafter opens the valve member smoothly, resulting in the desired continuous gradual and slow opening.

According to still another aspect of the present invention, a slow opening gas valve is provided such that after a specified time period, determined by the volumes of the expansible control chamber and the expansible auxiliary chamber, and the size of the metering orifice, the valve member is sufficiently open to allow ignition of gas and then continues to gradually open to provide full gas flow through the valve. Therefore, the gas valve provides a desirable continuous slow and gradual opening feature which produces less gas at the time of ignition, thereby minimizing ignition noise and rollout of gas flame that normally results from typical "fast" opening gas valves.

According to yet another aspect of the present invention, a method of controlling flow of gas uses a metering orifice to control the flow of gas through a valve having a valve member and an expansible control chamber, and comprises the step of slowing the expansion of the expansible control chamber using an expansible auxiliary chamber connected to the expansible control chamber by the metering orifice, thereby slowing the opening of the gas valve. The metering orifice and the expansible auxiliary chamber are sized to provide opening of the valve member gradually and smoothly. The method may further comprise the step of slowing the opening of the gas valve using a regulator coordinating with the expansible auxiliary chamber and the step of initially allowing gas flow with the valve member closed by using a bypass orifice, followed by a gradual and smooth opening. The initial flow through the bypass orifice provides optimum ignition gas pressure instantly, followed by a continuous and smooth opening of the valve member.

Thus, the present invention provides numerous novel features and advantages over prior gas control valves. In particular, the invention provides continuous slow gas valve opening that is both smooth and gradual, thereby resulting in ignition of gas at a low pressure achieving a much quieter ignition than provided by other known gas valves. The quieter ignition of the gas valve of the present invention eliminates the undesirable sound that oftentimes can be heard throughout a house, such as when a thermostat turns on an attached furnace system. Additionally, by providing a smoother ignition, the gas valve of the present invention may prolong the life of the component parts of the furnace or other system to which it is connected. Finally, the gas valve of the present invention, by allowing ignition at a lower gas level, not only reduces possible dangers resulting from excessive gas build-up before ignition, but is more efficient, thereby reducing the cost of use, as a result of the reduced amount of gas needed for ignition.

While the principal advantages and features of the present invention have been explained above, these and other features and advantages will be in part apparent and in part pointed out below.

DETAILED DESCRIPTION OF PREFERRED EMBODIMENT

Figure 1:
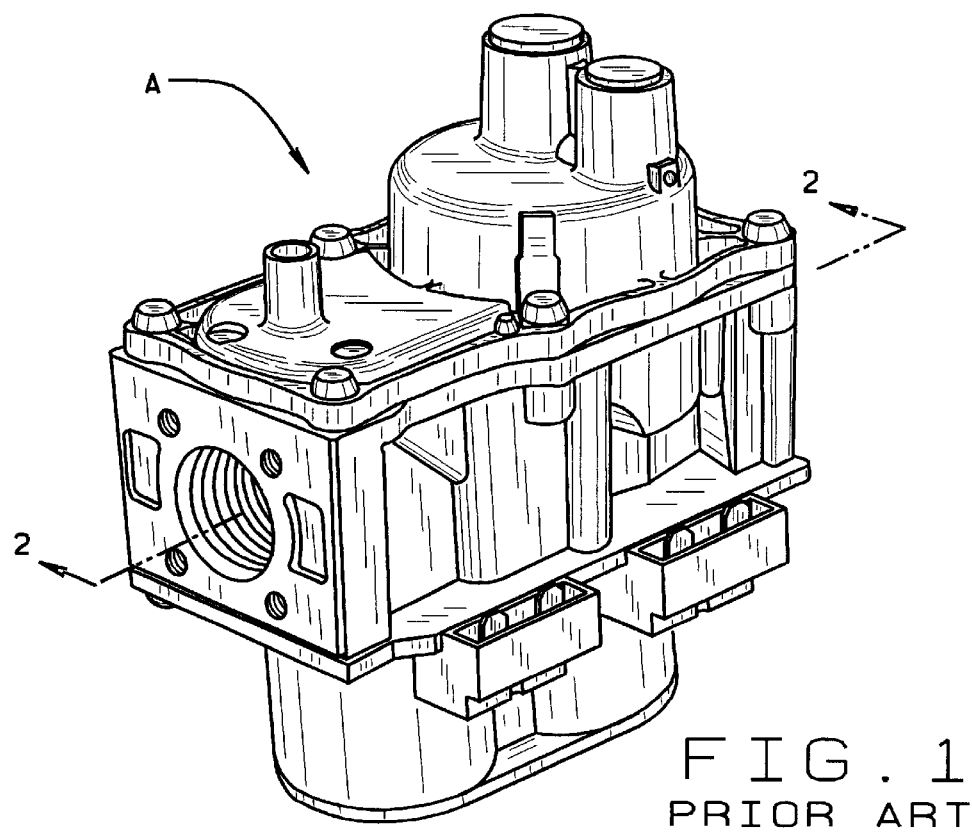
FIG. 1 is a perspective view of a prior art "fast" open gas valve.
Figure 2:
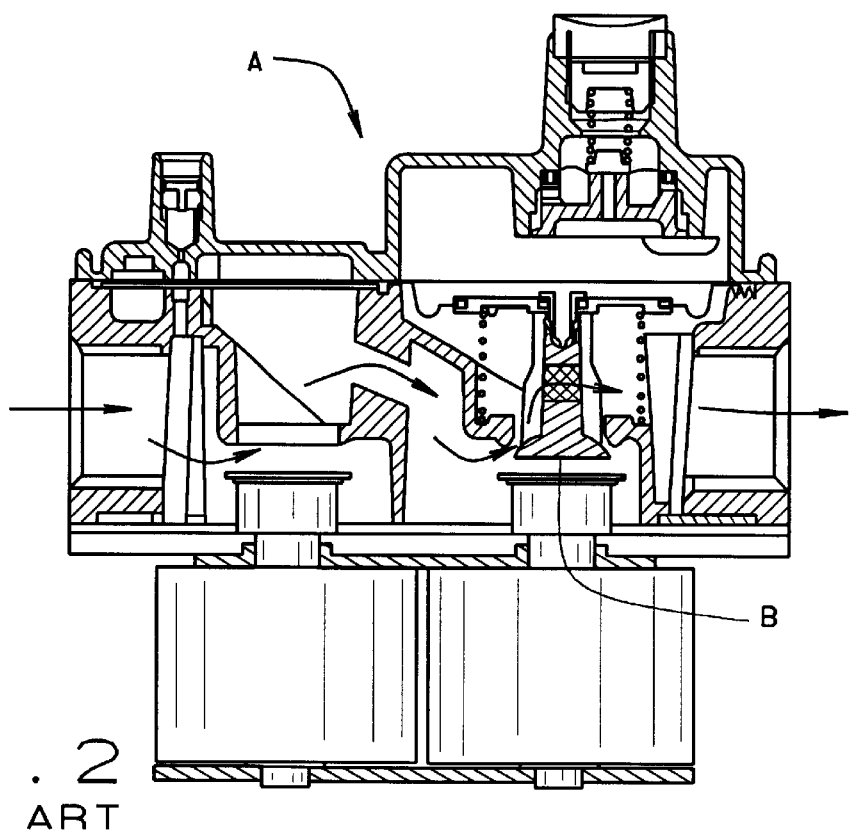
FIG. 2 is a cross-sectional view of the prior art "fast" open gas valve, taken along the plane of line 2—2 in FIG. 1.
Figure 3:
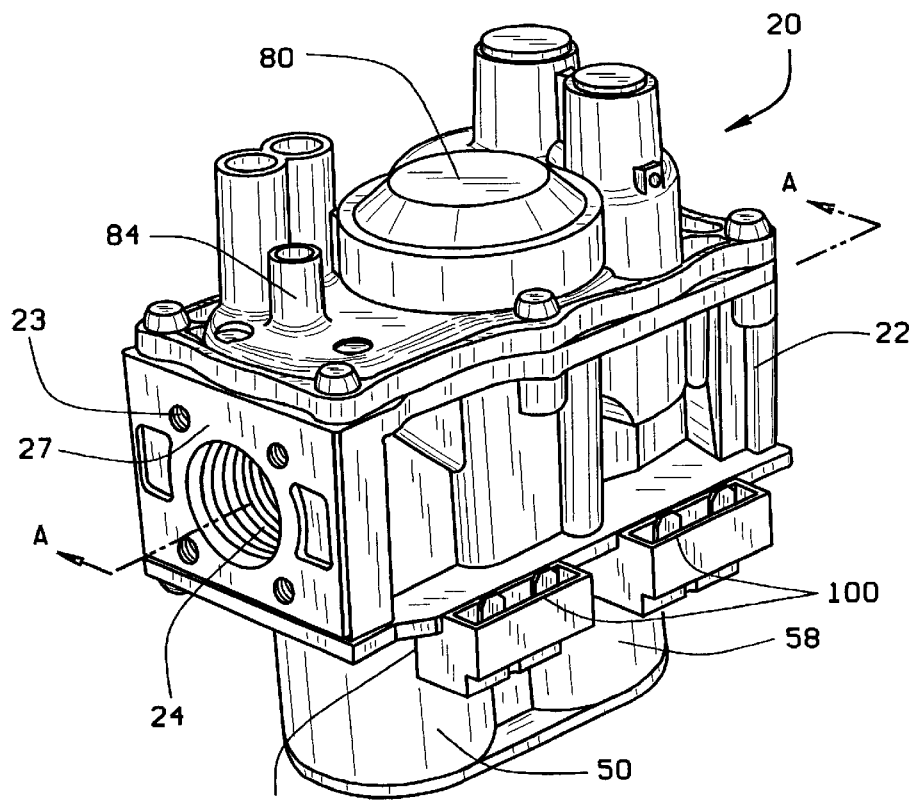
FIG. 3 is a perspective view of the gas valve constructed according to the principles of the present invention.

A typical prior art "fast" open gas valve is shown generally in FIGS. 1 and 2 and designated by reference character A. The prior art gas valve is not configured to provide a slow opening of valve member B and thereby typically causes an audible and/or rough ignition. In particular, the prior art gas valve does not provide an expansible auxiliary chamber connected to an expansible control chamber of the gas valve by a metering orifice.

A slow opening gas valve providing for both continuously gradual and smooth opening of its valve member is designated generally by reference numeral 20 in FIGS. 3, 4, 5 and 6.

Figure 4:
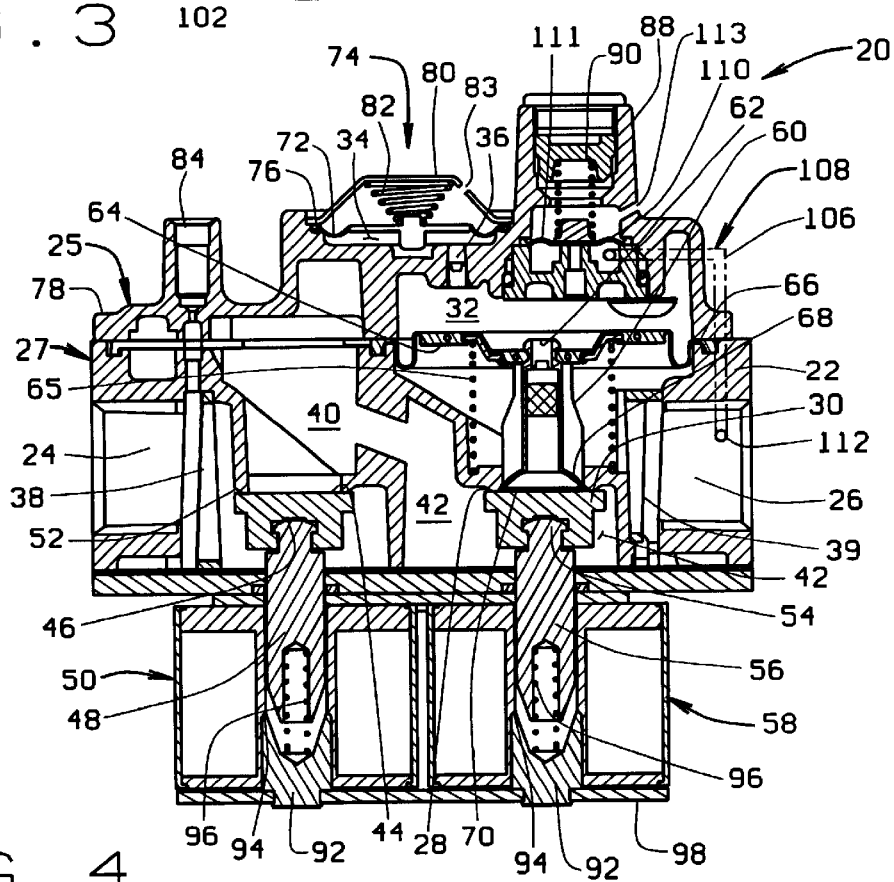
FIG. 4 is a cross-sectional view of the gas valve, taken along the plane of line A—A in FIG. 3.
Figure 5:
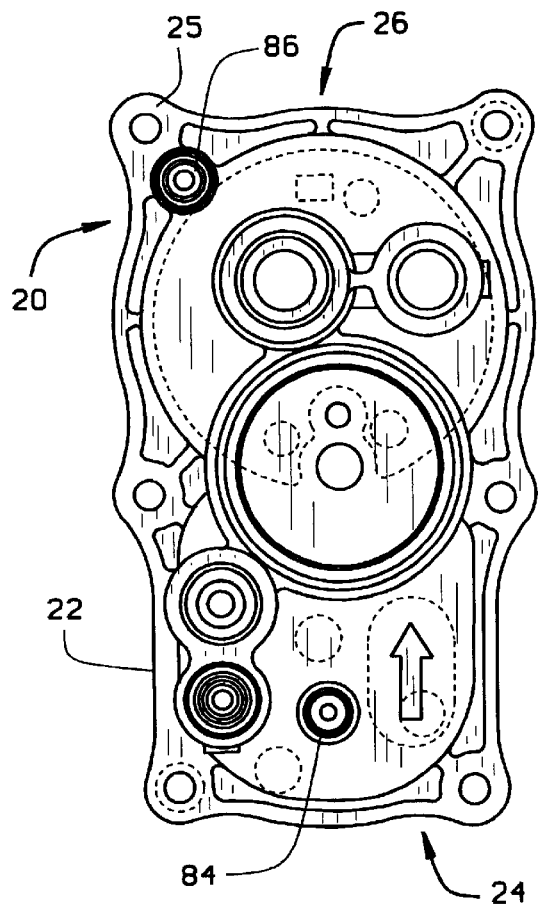
FIG. 5 is a top plan view of the gas valve upper portion.
Figure 6:
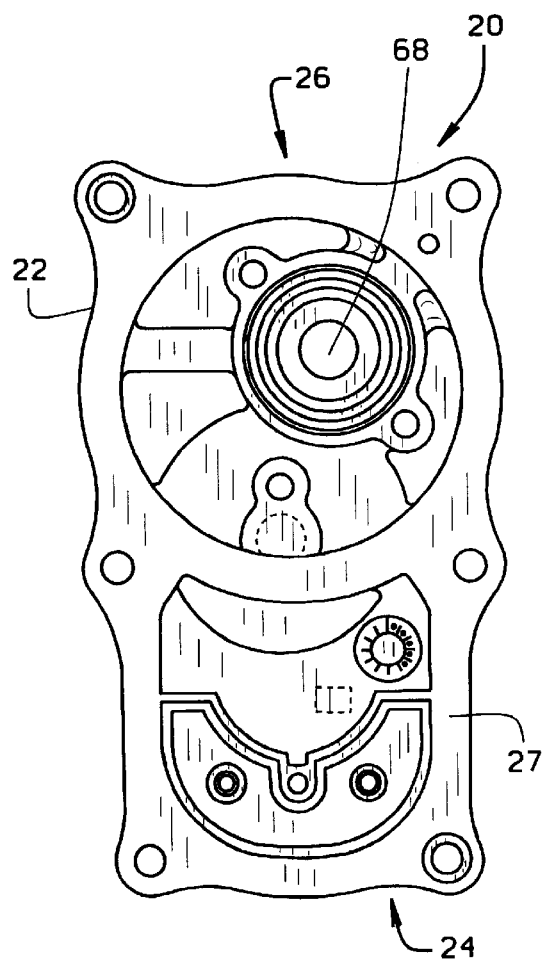
FIG. 6 is a bottom plan view of the gas valve upper portion.

As shown in FIG. 4, the improved slow opening gas valve of the present invention, indicated generally as 20 in FIG. 4, is basically comprised of a valve housing 22, an inlet 24, an outlet 26, an outlet valve seat 28, an outlet valve member 30, and an expansible control chamber 32 connected to an expansible auxiliary chamber 34 by a metering orifice 36. The outlet valve seat 28, outlet valve member 30 and expansible control chamber 32 are disposed within the valve housing 22 for control of the flow of gas.

Figure 7:
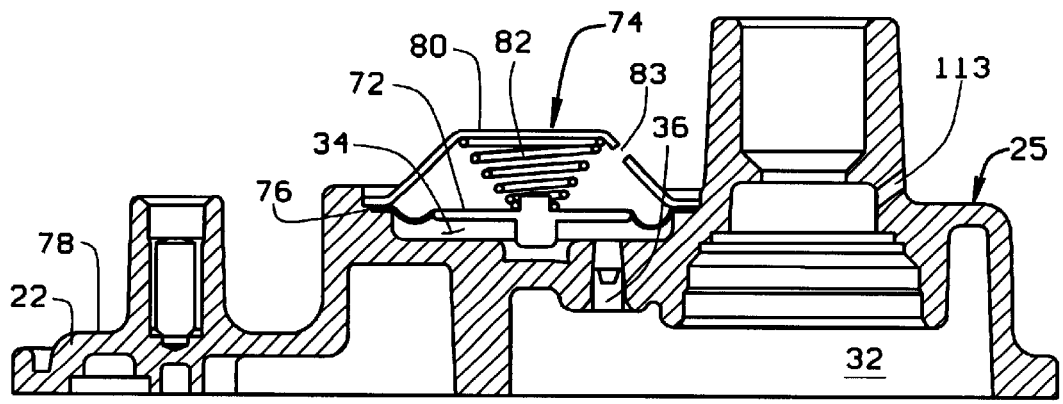
FIG. 7 is a partial cross-sectional view of the gas valve upper portion, taken along the plane of line A—A in FIG. 3.

The valve housing 22 is preferably molded in two pieces with an upper portion 25, as more clearly shown in FIG. 7, and a lower portion 27. The upper portion 25 and lower portion 27 are connected by bolts or similar fastening members. The inlet 24 is formed on the left-hand side of the valve 20 as shown in FIG. 4. The inlet 24 is threaded to facilitate connection to a gas source and an inlet filter 38 is provided for filtering impurities from gas provided at the inlet from a gas source. The outlet 26 is formed on the right-hand side of the valve 20 as shown in FIG. 4. The outlet 26 is likewise threaded, thereby facilitating connection to a gas burning apparatus, such as a furnace. The outlet 26 is provided with an outlet filter 39 for filtering impurities that might otherwise enter outlet 26 from the outside environment, such as during connection to a gas burning apparatus. Also, both the left-hand and right-hand side of valve 20 are tapped and provided with threads 23 to enable flange mounting of valve 20.

The gas valve 20 generally provides selective communication of gas from the inlet 24 to an inlet chamber 40, through an outlet chamber 42 and out of the outlet 26. The inlet chamber 40 comprises an inlet valve member 44 disposed adjacent to the inlet 24 that controls the flow of gas from the inlet. The inlet valve member 44 is provided on the distal end of a valve stem 46, which valve stem 46 is constructed as part of an armature 48 of an inlet solenoid 50. The inlet valve member 44 and inlet solenoid 50 are provided for controlling flow of gas from the inlet 24 to the outlet chamber 42. An inlet valve seat 52 is further provided such that upon energization of the inlet solenoid 50, the inlet valve 44, which is normally engaged in its closed position on the inlet valve seat 52, is lifted off the inlet valve seat 52 by armature 48, thereby permitting gas supplied to the inlet 24 by a gas source, to flow from the inlet 24 to the inlet chamber 40 and to the outlet chamber 42.

Outlet valve member 30 is normally disposed on outlet valve seat 28, both of which are contained within outlet chamber 42. Outlet valve member 30 is disposed on the distal end of a valve stem 54, which is provided as part of an armature 56 of an outlet solenoid 58 for controlling the flow of gas from the outlet chamber 42 to the outlet 26. In response to energization of the outlet solenoid 58, the outlet. valve 30, which is normally engaged in its closed position on the outlet valve seat 28, is lifted off the outlet valve seat 28 by the armature 56, thereby permitting flow of gas through the outlet chamber 42 to the expansible control chamber 32 via a control gas orifice 62.

Inlet solenoid 50 and outlet solenoid 58 each comprise a direct acting automatic valve with a seal tube 94, a core 92 and field replaceable coils 96, which are all provided within a solenoid housing 98. Further, the solenoids 50 and 58 are provided with connections 100 on an upper surface 102 of the solenoids for providing power to the solenoids and connecting the solenoids to a control unit or control circuit operable to energize and de-energize the solenoids when desired or needed.

Within the outlet chamber 42 is provided a main regulator poppet 60 with the control gas orifice 62 therethrough. The main regulator poppet 60 is operatively connected to the expansible control chamber 32, such that gas flow from the inlet 24 through the inlet chamber 40, and to the outlet chamber 42, flows into the main regulator poppet 60 and passes through the control gas orifice 62 into the expansible control chamber 32. Therefore, upon energization of the outlet solenoid 58, outlet valve 30 lifts off of outlet valve seat 28, thereby providing flow of gas through the outlet chamber 42, into the main regulator poppet 60 and through the control gas orifice 62 to the expansible control chamber 32. Additionally, with the outlet valve member 30 lifted off of the outlet valve seat 28, gas flow is also provided through a bypass orifice 68 to the outlet 26. The bypass orifice 68 is provided as part of the main regulator poppet 60 at its distal end 70, and communicates with the outlet 26.

The expansible control chamber 32 comprises a diaphragm 64 forming a moveable wall of the expansible control chamber. The diaphragm 64 comprises a peripheral edge 66 sealingly clamped between the upper portion 25 and the lower portion 27 of the valve housing 22 to provide a fluid (i.e., gas) tight chamber. The expansible control chamber 32 provides control of the opening of the main regulator poppet 60, and therefore controls flow of gas both past the main regulator poppet 60 to the outlet 26 and through the main regulator poppet 60 to the expansible control chamber 32, after energization of the outlet solenoid 58 lifts valve member 30 off of outlet valve seat 28. With the expansible control chamber 32 communicating with the main regulator poppet 60 through the control gas orifice 62, control of gas flow from outlet chamber 42, out of outlet 26, is provided by downward pressure exerted on the diaphragm 64 by gas contained within the expansible control chamber 32 against the opposing force of a spring 65.

The expansible control chamber 32 is operatively connected to and communicates with the expansible auxiliary chamber 34 via the metering orifice 36, which metering orifice 36 is preferably provided on a top surface 78 of the upper portion 25 of the valve housing 22. As is more clearly shown in FIG. 7, the expansible auxiliary chamber 34 comprises a moveable diaphragm 72 and a regulator 74 to provide for controlling the speed of the opening of the main regulator poppet 60 by controlling the rate of expansion of the expansible control chamber and thus the downward movement of the diaphragm 64. The changed rate of movement of the main regulator poppet 60 results from a changed rate of gas pressure build-up in the expansible control chamber 32 due to some gas flow into the expansible auxiliary chamber 34 via the metering orifice 36. The diaphragm 72 comprises a peripheral edge 76 clamped between the top surface 78 of the upper portion 25 of the valve housing 22 and a protective cap 80, having an air vent 83.

The regulator 74 preferably comprises at least one biasing spring 82 between the cap 80 and diaphragm 72 that constantly urges the diaphragm 72 of the auxiliary chamber 34 downward to resist expansion of the auxiliary chamber and provide control of the opening of the main regulator poppet 60 and thus of the opening of the gas valve 20. The spring 82 is configured to provide sufficient force to the diaphragm 72, such that a rate of expansion of the expansible auxiliary chamber 34 is thereby defined. Thus, the expansible auxiliary chamber 34, which is operatively connected by the metering orifice 36 to the expansible control chamber 32, provides the desired controlled opening of the gas valve 20 and results in the provision of ignition of gas at a lower pressure level.

The gas valve 20 is further preferably provided with an inlet pressure test nipple 84 and an outlet pressure test nipple 86 to allow for testing and determining the pressure levels at the inlet 24 and outlet 26, respectively. Thereafter, the desired gas pressure at the inlet 24 and outlet 26 can be set according to the specifications of the gas valve and depending upon the system to which the gas valve is attached. A pressure adjustment member 88 is provided with a regulator adjust screw 90 for setting the desired gas pressure within the gas valve 20. Thereafter, the pressure test nipples 84, 86 may again be used to determine if proper gas pressure has been achieved.

Figure 8:
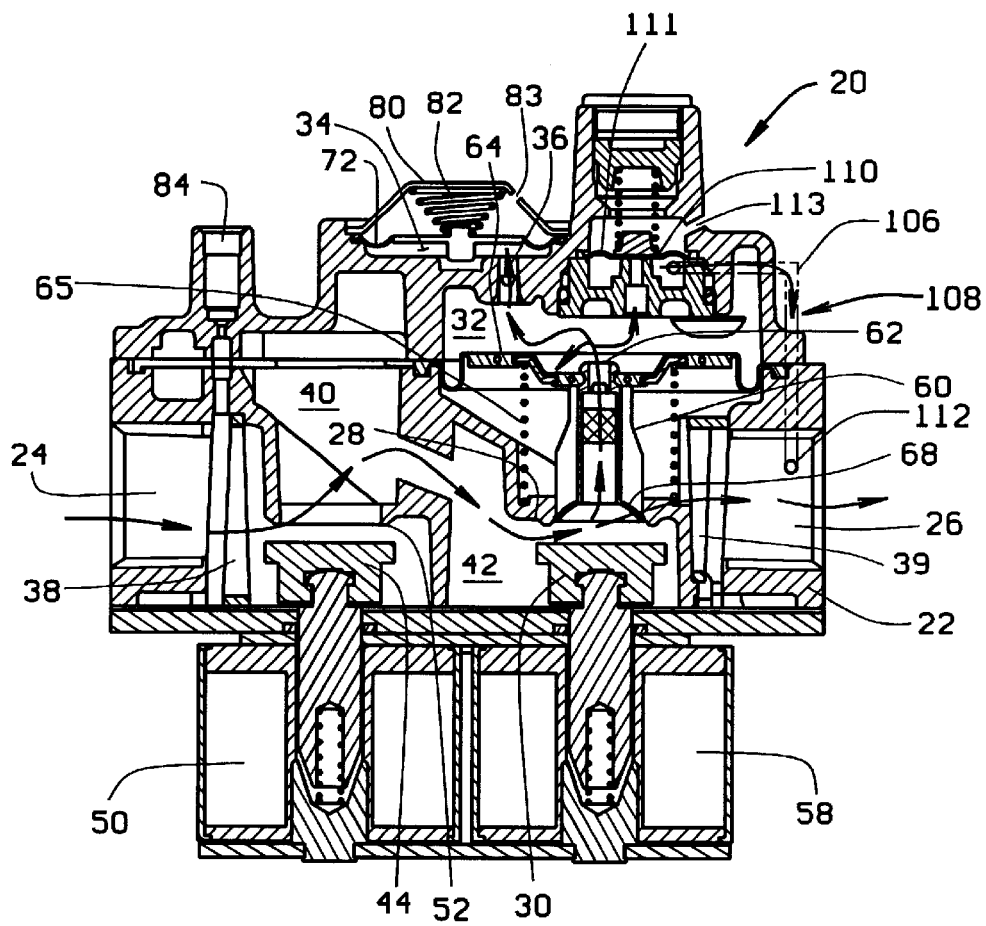
FIG. 8 is a cross-sectional view of the gas valve, taken along the plane of line A—A in FIG. 3, showing the solenoids initially energized.

In operation, inlet solenoid 50 and outlet solenoid 58 are initially energized, as shown in FIG. 8, in response to a command, e.g. from a control unit connected to the connections 100. The control unit may be a thermostat for controlling a furnace, but can be any control system configured or adapted for attachment to the connections 100. Upon energization of the solenoids 50 and 58, inlet solenoid 50 lifts inlet valve member 44 off of inlet valve seat 52 and outlet solenoid 58 lifts outlet valve member 30 off of outlet valve seat 28. Initially, gas flow is provided from the inlet 24, through the inlet chamber 40, to the outlet chamber 42 and through the bypass orifice 68 of the main regulator poppet 60 to the outlet 26, as shown in FIG. 8. Gas flow is also provided through the control gas orifice 62 of the main regulator poppet 60 to the expansible control chamber 32. A small amount of gas also flows through a bypass bleed 108 which is preferably provided as a small slot 110 in a regulator diaphragm 111. One side of diaphragm 111 is exposed to atmospheric pressure through an air vent 113. Bypass bleed 108 further preferably comprises a venting passage 106 and an outlet port 112 communicating the expansible control chamber 32 with the outlet 26.

Gas flow through the control gas orifice 62 in the main regulator poppet 60 begins to fill the expansible control chamber 32, with some of the gas passing through the metering orifice 36 into the expansible auxiliary chamber 34, and a small amount of the gas venting through bypass bleed 108. The gas flow into the expansible auxiliary chamber 34 slows the rate of expansion of the expansible control chamber 32, and thus slows the downward movement of the diaphragm 64 of expansible control chamber 32. Gas pressure build-up in the expansible control chamber 32 is slowed by the flow of gas into the expansible auxiliary chamber 34 via the metering orifice 36. The slowing of the downward movement of the diaphragm 64 slows the downward movement of the main regulator poppet 60, thus slowing its opening, thereby resulting in slowing of the rate of increase of gas flow through the outlet chamber 42 and slowing gas pressure build-up at the outlet 26.

Figure 9:
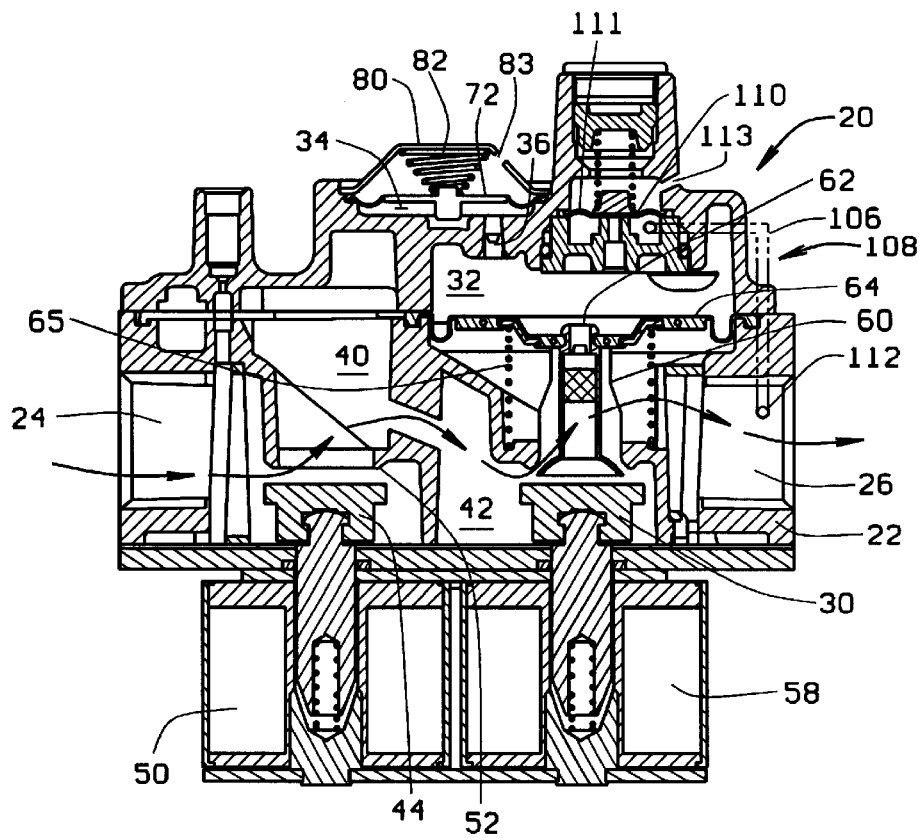
FIG. 9 is a cross-sectional view of the gas valve as shown in FIG. 8, showing the valve in its full gas flow.
Figure 11:
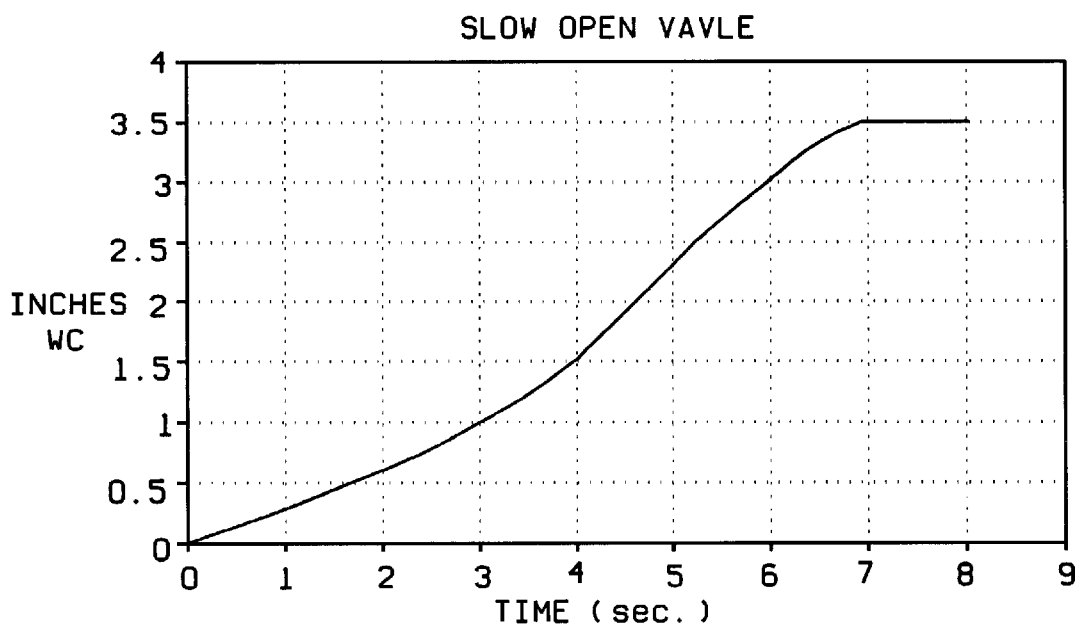
FIG. 11 is a graph of the opening curve of the gas valve of FIG. 3.
Figure 12:
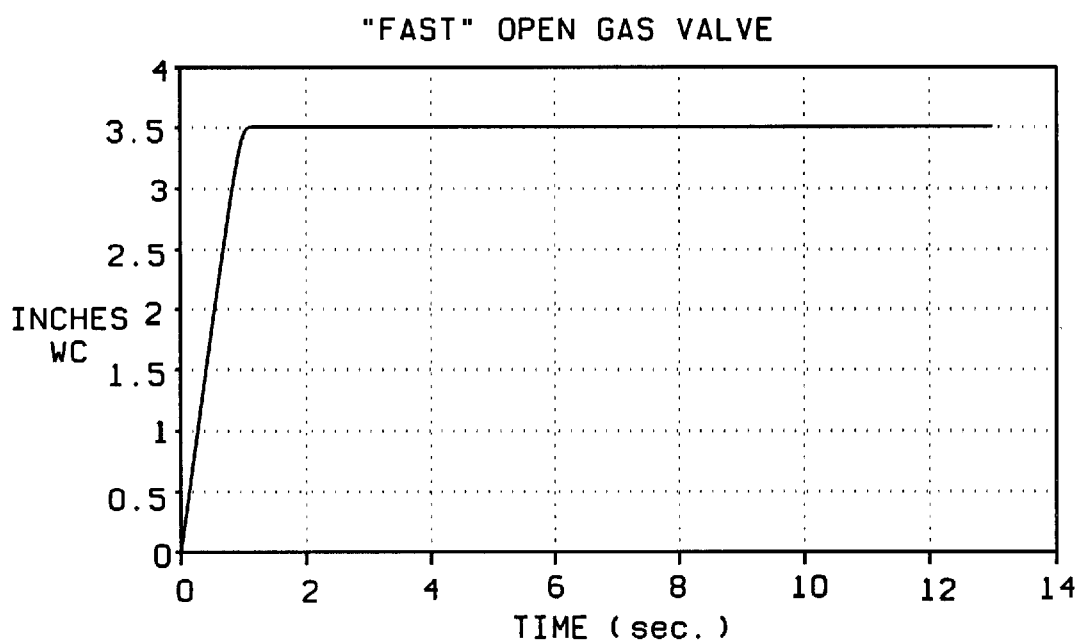
FIG. 12 is a graph of the opening curve of a "fast" open gas valve.

After a selected time period, which is in part determined by the volume of the expansible control chamber 32, the volume of the expansible auxiliary chamber 34, the force applied by biasing spring 82, and the size of the metering orifice 36, the main regulator poppet 60 is moved downward sufficiently to allow full gas flow past valve seat 28 and to the outlet 26 as shown in FIG. 9. As a result of the presence of auxiliary chamber 34 and the metering orifice 36, movement of the main regulator poppet 60 is continuous and slow, so that gas flow provided to the outlet 26 gradually increases until full gas flow is achieved, as shown in FIG. 11. The prior art "fast" open gas valves provide full gas flow rapidly, as shown in FIG. 12, thereby resulting in rough and/or audible ignitions.

When solenoids 50 and 58 are de-energized in response to a deactivation command by a control unit connected to the connections 100 of the solenoids, such as when a thermostat determines that a furnace should be shut off due to a certain predetermined condition, inlet solenoid 50 moves inlet valve 44 onto inlet valve seat 52, thereby engaging the valve seat and blocking gas flow through the inlet 24 and into the gas valve 20.

Figure 10:
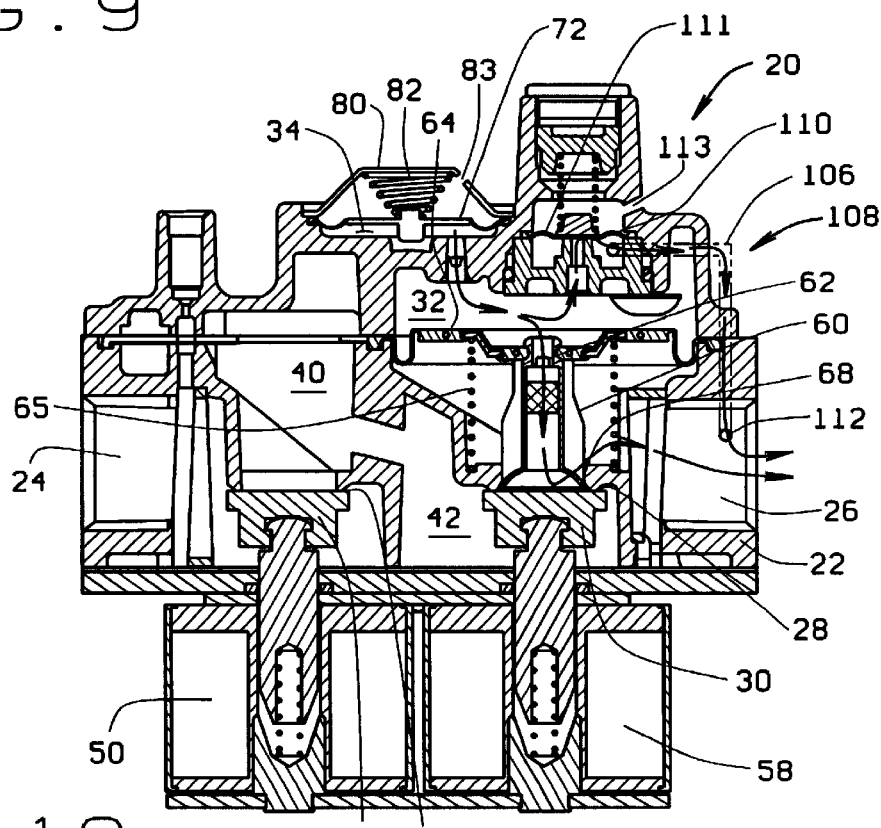
FIG. 10 is a cross-sectional view of the gas valve, as shown in FIGS. 8 and 9, shown with the solenoids de-energized.

Further, and as more clearly shown in FIG. 10, outlet valve 30 does not immediately engage outlet valve seat 28 because residual gas in the expansible control chamber 32 remains, thereby preventing immediate upward movement of the main regulator poppet 60. It will take a few seconds for the expansible control chamber 32 to vent sufficiently and reduce gas pressure, thereby allowing for upward movement of the diaphragm 64 and upward movement of the main regulator poppet 60 sufficiently to allow engagement of outlet valve 30 onto outlet valve seat 28. Residual gas is vented back through the control gas orifice 62 and the bypass orifice 68 to the outlet 26.

Venting of gas is also provided through a second path comprising the previously-described bypass bleed 108.

To provide gas ignition at a low pressure and enable a much quieter and smoother ignition than provided by "fast" opening valves, the diameter of the metering orifice 36 is preferably about 0.010 inches, but is preferably no less than about 0.008 inches and no greater than about 0.012 inches. The diameter of the control gas orifice 62 is preferably between 0.006 inches and 0.008 inches. Finally, the size of the bypass orifice 68 is preferably about 0.0170 inches$^2$. In general, maintaining a size ratio of 1.53/1.06 between the metering orifice 36 and control gas orifice 62 results in the desired continuous gradual and slow smooth opening of the gas valve 20. However, these orifice dimensions, along with the volumes of the expansible control chamber 32 and expansible auxiliary chamber 34, and the stiffness of the springs 65 and 82, may be configured by one skilled in the art to provide the desired slow opening of the gas valve 20.

Figure 13:
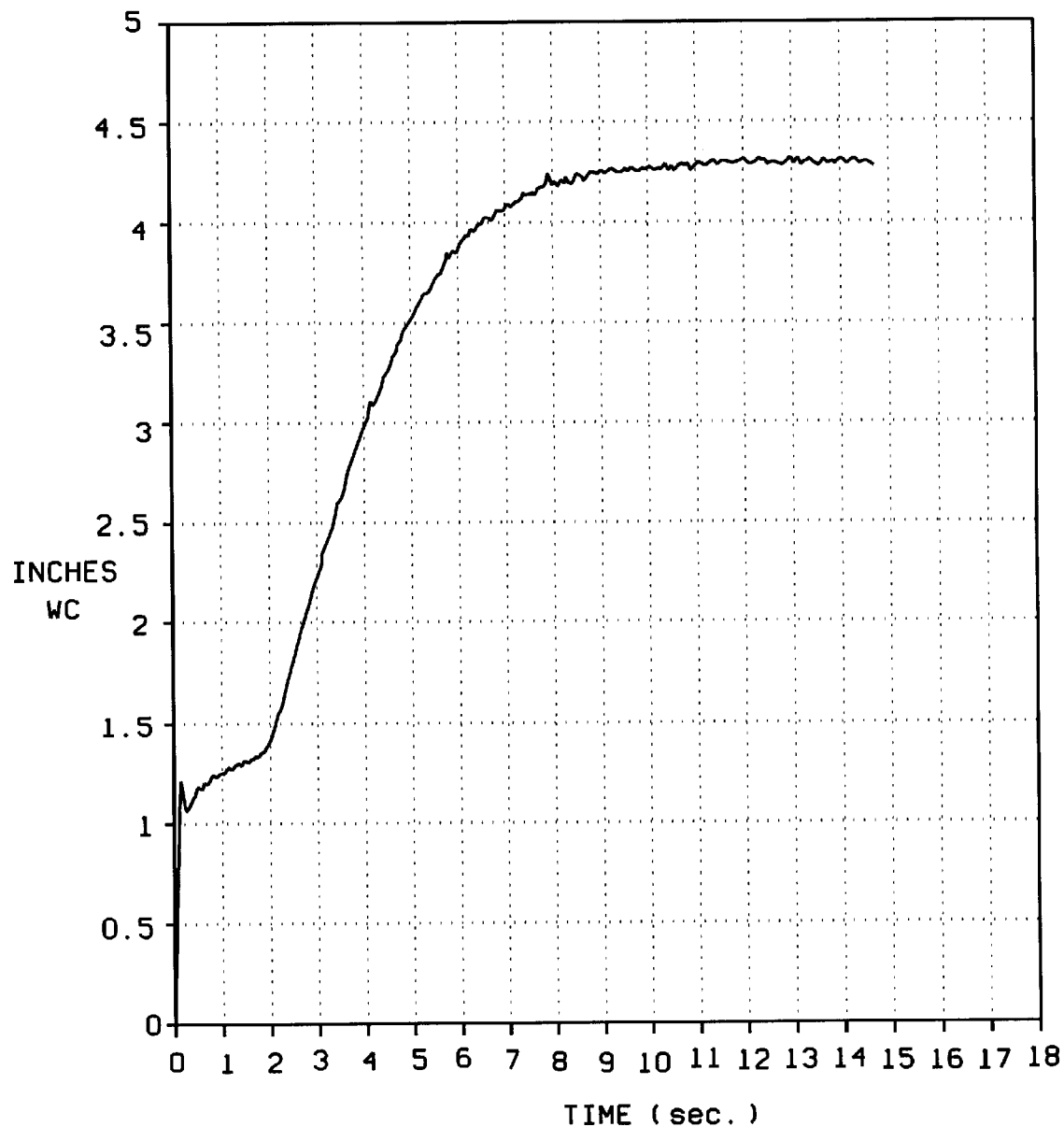
FIG. 13 is a graph of the opening curve of the gas valve constructed according to the principles of the present invention having a "step" function.

In an alternative embodiment, the size of the bypass orifice 68 is configured to provide an initial required flow with the main regulator poppet 60 closed, followed by a slow opening of the poppet 60 previously described. This arrangement provides an optimum ignition gas pressure instantly, followed by a continuous and smooth opening of the main regulator poppet 60, whereby the gas flow gradually increases. As it can be appreciated by one skilled in the art, in this embodiment, the size of the bypass orifice 68 is preferably made larger. It should also be understood that more than one bypass orifice could be used. The size depends on the desired duration and extent of the initial gas flow. Thus, in this embodiment, a "step" function, as shown in FIG. 13, is provided to the otherwise slow opening of the valve 20.

The slow open gas valve 20 of the present invention has been disclosed with reference generally to an application having a furnace system controlled by a thermostat. However, it should be apparent to one skilled in the art that the gas valve 20 of the present invention may be used in many different systems in which the control of gas flow is required, and in particular, where both continuous and smooth gradual opening of the gas valve is desired.

Further, it should be understood that the expansible auxiliary chamber 34 of the present invention, which is connected via the metering orifice 36 to the expansible control chamber 32 of the gas valve 20, may be configured and employed in various different gas valves and is not limited to the gas valve shown. Further, the present invention may be used in connection with gas valves having different applications, such as providing for ignition of gas furnaces, gas cooking ranges or water heaters. In addition, although the gas valve 20 is shown with specific component parts and controls, the particular component parts are not required for the proper operation of the gas valve with the expansible auxiliary chamber 34. The expansible auxiliary chamber 34 of the present invention may be employed in gas valves having different chamber configurations and valve mechanisms.

Therefore, while the present invention has been described by reference to specific embodiments, it should be understood and apparent to those skilled in the art that modifications and variations of the invention may be constructed without departing from the scope of the invention. It is therefore intended that the invention be limited only by the scope of the claims appended hereto, and their equivalents.

What is claimed:

1. An improved slow opening gas valve, the gas valve of the type having an inlet, an outlet, a valve seat, a normally closed valve member operable between a closed position in which the valve member is seated in the seat blocking flow through the seat and an open position in which the valve member is spaced from the seat and allows flow through the valve seat, and a diaphragm forming a movable wall of an expansible control chamber, the diaphragm operable upon expansion of the expansible control chamber to move the valve member to the open position, the improvement comprising an expansible auxiliary chamber connected to the expansible control chamber by a metering orifice to control the expansion of the expansible control chamber and thereby control the opening of the gas valve, with the expansible control chamber in fluid communication with the inlet and outlet.

2. The improved slow opening gas valve according to claim 1 wherein the expansible auxiliary chamber comprises a moveable diaphragm and a regulator for controlling the movement of the diaphragm.

3. The improved slow opening gas valve according to claim 2 wherein the regulator is at least one spring.

4. The improved slow opening gas valve according to claim 3 wherein the volumes of the expansible control chamber and expansible auxiliary chamber are configured to open the valve member and provide gas at the outlet continuously.

5. The improved slow opening gas valve according to claim 4 wherein the volumes of the expansible control chamber and expansible auxiliary chamber are configured to open the valve member and provide gas at the outlet gradually and smoothly.

6. An improved slow opening gas valve, the gas valve of the type having an inlet, an outlet, a valve seat, a normally closed valve member operable between a closed position in which the valve member is seated in the seat blocking flow through the seat and an open position in which the valve member is spaced from the seat and allows flow through the valve seat, and a diaphragm forming a movable wall of an expansible control chamber, the diaphragm operable upon expansion of the expansible control chamber to move the valve member to the open position, the improvement comprising an expansible auxiliary chamber having a moveable diaphragm and regulator with at least one spring for controlling the movement of the moveable diaphragm, the expansible auxiliary chamber connected to the expansible control chamber by a metering orifice to control the expansion of the expansible control chamber with the diameter of the metering orifice and the volumes of the expansible control chamber and expansible auxiliary chamber configured to control the opening of the valve member and provide continuous gas at the outlet gradually and smoothly.

7. The improved slow opening gas valve according to claim 6 wherein the normally closed valve member further comprises a bypass orifice.

8. The improved slow opening gas valve according to claim 7 wherein the bypass orifice is configured to initially provide a required gas flow with the valve member closed, followed by a gradual and smooth opening.

9. A slow opening gas valve comprising an inlet, an outlet, a valve seat, a normally closed valve member operable between a closed position in which the valve member is seated in the seat blocking flow through the seat and an open position in which the valve member is spaced from the seat and allows flow through the valve seat, and a diaphragm forming a movable wall of an expansible control chamber that is configured for fluid communication with the inlet and outlet, the diaphragm operable upon expansion of the expansible control chamber to move the valve member to the open position, and an expansible auxiliary chamber connected to the expansible control chamber by a metering orifice to control the expansion of the expansible control chamber and thereby control the opening of the gas valve.

10. The slow opening gas valve according to claim 9 wherein the movable wall further comprises at least one spring.

11. The slow opening gas valve according to claim 10 wherein the volume of the expansible control chamber and the volume of the expansible auxiliary chamber are configured to open the valve member and provide gas at the outlet continuously.

12. The slow opening gas valve according to claim 11 wherein the volume of the expansible control chamber and the volume of the expansible auxiliary chamber are configured to open the valve member and provide gas at the outlet gradually and smoothly.

13. A slow opening gas valve comprising an inlet, an outlet, a valve seat, a normally closed valve member operable between a closed position in which the valve member is seated in the seat blocking flow through the seat and an open position in which the valve member is spaced from the seat and allows flow through the valve seat, a diaphragm forming a movable wall of an expansible control chamber, the diaphragm operable upon expansion of the expansible control chamber to move the valve member to the open position with the moveable wall including at least one spring, and an expansible auxiliary chamber connected to the expansible control chamber by a metering orifice to control the expansion of the expansible control chamber with the diameter of the metering orifice configured to coordinate with the expansible control chamber to control the opening of the valve member, and the volume of the expansible control chamber and the volume of the expansible auxiliary chamber configured to open the valve member and provide continuous gas at the outlet gradually and smoothly.

14. The improved slow opening gas valve according to claim 13 wherein the normally closed valve member further comprises a bypass orifice.

15. The improved slow opening gas valve according to claim 14 wherein the bypass orifice is configured to initially provide a required gas flow with the valve member closed, followed by a gradual and smooth opening.

16. A method of using a metering orifice to control the flow of gas through a valve having a valve member and an expansible control chamber, the method comprising the step of:

slowing expansion of the expansible control chamber using an expansible auxiliary chamber connected to the expansible control chamber by the metering orifice, wherein the metering orifice and the expansible auxiliary chamber are sized to provide opening of the valve member gradually and smoothly.

17. The method of claim 16 further comprising the step of slowing the opening of the valve member using a regulator coordinating with the expansible auxiliary chamber.

18. The method of claim 17 wherein the valve member includes a bypass orifice and further comprising the step of initially allowing gas flow with the valve member closed, by using the bypass orifice, followed by a gradual and smooth opening of the valve member.

* * * * *